(12) United States Patent
Benson et al.

(10) Patent No.: US 9,703,100 B2
(45) Date of Patent: Jul. 11, 2017

(54) CHANGE NATURE OF DISPLAY ACCORDING TO OVERALL MOTION

(71) Applicant: Sony Computer Entertainment Europe Limited, London (GB)

(72) Inventors: Simon Mark Benson, London (GB);
Ian Henry Bickerstaff, London (GB);
Sharwin Winesh Raghoebardayal, London (GB)

(73) Assignee: Sony Computer Entertainment Europe Limited (GB)

( * ) Notice: Subject to any disclaimer, the term of this patent is extended or adjusted under 35 U.S.C. 154(b) by 272 days.

(21) Appl. No.: 14/300,684

(22) Filed: Jun. 10, 2014

(65) Prior Publication Data
US 2014/0362113 A1    Dec. 11, 2014

(30) Foreign Application Priority Data

Jun. 11, 2013    (GB) .................................. 1310367.6
Aug. 21, 2013    (GB) .................................. 1314974.5

(51) Int. Cl.
*G02B 27/01*    (2006.01)
*G06F 3/01*    (2006.01)
*G02B 27/00*    (2006.01)
*G06T 11/00*    (2006.01)

(52) U.S. Cl.
CPC ..... *G02B 27/0172* (2013.01); *G02B 27/0093* (2013.01); *G02B 27/0179* (2013.01); *G06F 3/012* (2013.01); *G06T 11/00* (2013.01); *G02B 2027/0187* (2013.01)

(58) Field of Classification Search
None
See application file for complete search history.

(56) References Cited

U.S. PATENT DOCUMENTS

| | | | |
|---|---|---|---|
| 5,742,264 A | 4/1998 | Inagaki et al. |
| 5,917,460 A | 6/1999 | Kodama |
| 5,966,680 A | 10/1999 | Butnaru |
| 7,918,781 B1 | 4/2011 | Smyth et al. |
| 2005/0156817 A1 | 7/2005 | Iba |
| 2005/0195128 A1 | 9/2005 | Sefton |
| 2008/0122737 A1 | 5/2008 | Lea et al. |

(Continued)

FOREIGN PATENT DOCUMENTS

| | | |
|---|---|---|
| EP | 1731943 A1 | 12/2006 |
| EP | 1977931 A1 | 10/2008 |

(Continued)

OTHER PUBLICATIONS

Combined Search and Examination Report for Application No. GB 1410396.4 dated Dec. 5, 2014.

(Continued)

*Primary Examiner* — Jwalant Amin
(74) *Attorney, Agent, or Firm* — Lerner, David, Littenberg, Krumholz & Mentlik, LLP

(57) ABSTRACT

A head mountable display (HMD) is operable to detect the HMD's overall motion relative to its current orientation, and to display extra image material so that the extra image material moves in the same general direction as real objects would be seen by the user to move if the user were not wearing the HMD.

12 Claims, 10 Drawing Sheets

(56) References Cited

U.S. PATENT DOCUMENTS

| | | | |
|---|---|---|---|
| 2009/0290079 A1* | 11/2009 | Evans | G02B 27/2278 349/18 |
| 2010/0103075 A1 | 4/2010 | Kalaboukis et al. | |
| 2010/0125816 A1* | 5/2010 | Bezos | G06F 1/1626 715/863 |
| 2010/0157433 A1 | 6/2010 | Mukawa et al. | |
| 2011/0270522 A1 | 11/2011 | Fink | |
| 2012/0027373 A1 | 2/2012 | Chuang et al. | |
| 2012/0188148 A1 | 7/2012 | DeJong | |
| 2012/0212398 A1* | 8/2012 | Border | G02B 27/017 345/8 |
| 2012/0249416 A1 | 10/2012 | Maciocci et al. | |
| 2013/0016218 A1* | 1/2013 | Asao | B60Q 5/008 348/148 |
| 2013/0106674 A1* | 5/2013 | Wheeler | G02B 27/017 345/8 |

FOREIGN PATENT DOCUMENTS

| | | |
|---|---|---|
| JP | 2009036517 A | 2/2009 |
| WO | 02056792 A2 | 7/2002 |
| WO | 2012166593 A2 | 12/2012 |

OTHER PUBLICATIONS

Search Report for Application No. GB 1310367.6 dated Nov. 15, 2013.
Search Report for Application No. GB 1314974.5 dated Jan. 24, 2014.
Examination Report for GB Application No. 1410396.4 dated Jan. 13, 2017.

* cited by examiner

CHANGE NATURE OF DISPLAY ACCORDING TO OVERALL MOTION

CROSS REFERENCE TO RELATED APPLICATION

The present application claims the benefit of and priority to UK Patent Application No. GB 1310367.6, filed Jun. 11, 2013, and to UK Patent Application No. GB 1314974.5, filed Aug. 21, 2013, the entire contents of which applications are incorporated herein by reference.

BACKGROUND

Field of the Disclosure

This invention relates to head-mountable apparatus and systems.

Description of the Prior Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

A head-mountable display (HMD) is one example of a head-mountable apparatus. Audio headphones comprising a frame supporting one or more audio transducers are another example of a head-mountable apparatus. A head-mounted torch or light is a further example of a head-mountable apparatus. The following background discussions will relate mainly to HMDs, but the principles are also applicable to other types of head-mountable apparatus.

In an HMD, an image or video display device is provided which may be worn on the head or as part of a helmet. Either one eye or both eyes are provided with small electronic display devices.

Some HMDs allow a displayed image to be superimposed on a real-world view. This type of HMD can be referred to as an optical see-through HMD and generally requires the display devices to be positioned somewhere other than directly in front of the users eyes. Some way of deflecting the displayed image so that the user may see it is then required. This might be through the use of a partially reflective mirror placed in front of the user's eyes so as to allow the user to see through the mirror but also to see a reflection of the output of the display devices. In another arrangement, disclosed in EP-A-1 731 943 and US-A-2010/0157433, a waveguide arrangement employing total internal reflection is used to convey a displayed image from a display device disposed to the side of the user's head so that the user may see the displayed image but still see a view of the real world through the waveguide. Once again, in either of these types of arrangement, a virtual image of the display is created (using known techniques) so that the user sees the virtual image at an appropriate size and distance to allow relaxed viewing. For example, even though the physical display device may be tiny (for example, 10 mm×10 mm) and may be just a few millimeters from the user's eye, the virtual image may be arranged so as to be perceived by the user at a distance of (for example) 20 m from the user, having a perceived size of 5 m×5 m.

Other HMDs, however, allow the user only to see the displayed images, which is to say that they obscure the real world environment surrounding the user. This type of HMD can position the actual display devices in front of the user's eyes, in association with appropriate lenses or other optical components which place a virtual displayed image at a suitable distance for the user to focus in a relaxed manner—for example, at a similar virtual distance and perceived size as the optical see-through HMD described above. This type of device might be used for viewing movies or similar recorded content, or for viewing so-called virtual reality content representing a virtual space surrounding the user. It is of course however possible to display a real-world view on this type of HMD, for example by using a forward-facing camera to generate images for display on the display devices.

Although the original development of HMDs was perhaps driven by the military and professional applications of these devices, HMDs are becoming more popular for use by casual users in, for example, computer game or domestic computing applications.

The foregoing paragraphs have been provided by way of general introduction, and are not intended to limit the scope of the following claims. The described embodiments, together with further advantages, will be best understood by reference to the following detailed description taken in conjunction with the accompanying drawings.

Various aspects and features of the present invention are defined in the appended claims and within the text of the accompanying description and include at least a head mountable apparatus such as a display and a method of operating a head-mountable apparatus as well as a computer program.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
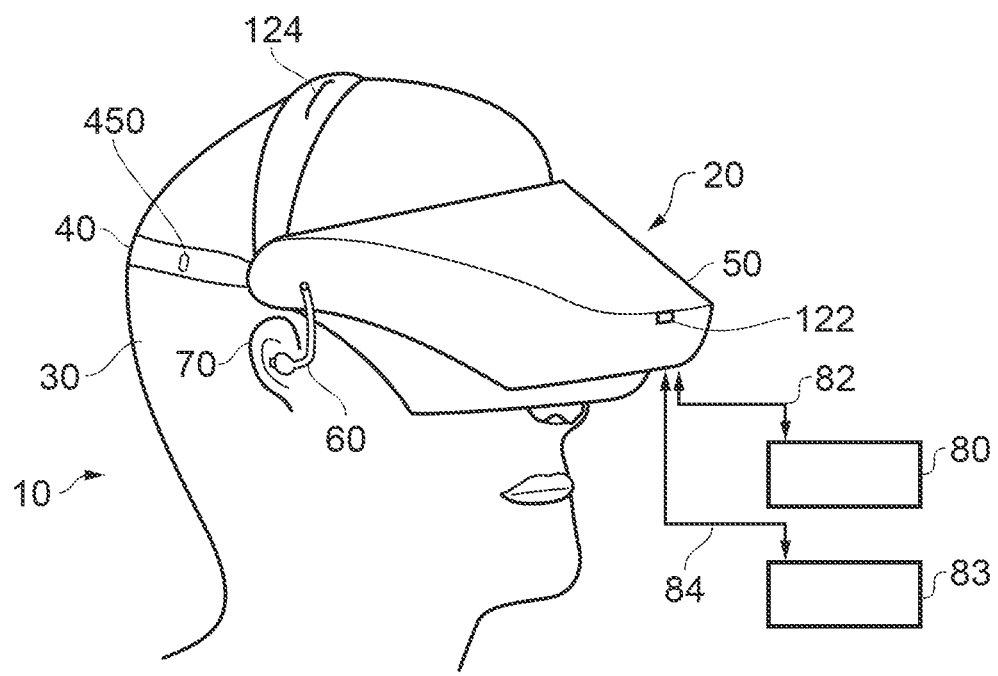
FIG. 1 schematically illustrates an HMD worn by a user.

Referring now to FIG. 1, a user 10 is wearing an HMD 20 (as an example of a generic head-mountable apparatus—other examples, where the technical context allows, including audio headphones or a head-mountable light source) on the users head 30. The HMD comprises a frame 40, in this example formed of a rear strap and a top strap, and a display portion 50.

Note that the HMD of FIG. 1 may comprise further features, to be described below in connection with other drawings, but which are not shown in FIG. 1 for clarity of this initial explanation.

The HMD of FIG. 1 completely (or at least substantially completely) obscures the user's view of the surrounding environment. All that the user can see is the pair of images displayed within the HMD.

The HMD has associated headphone audio transducers or earpieces 60 which fit into the users left and right ears 70. The earpieces 60 replay an audio signal provided from an external source, which may be the same as the video signal source which provides the video signal for display to the users eyes.

The combination of the fact that the user can see only what is displayed by the HMD and, subject to the limitations of the noise blocking or active cancellation properties of the earpieces and associated electronics, can hear only what is provided via the earpieces, mean that this HMD may be considered as a so-called "full immersion" HMD. Note however that in some embodiments the HMD is not a full immersion HMD, and may provide at least some facility for the user to see and/or hear the user's surroundings. This could be by providing some degree of transparency or partial transparency in the display arrangements, and/or by projecting a view of the outside (captured using a camera, for example a camera mounted on the HMD) via the HMD's displays, and/or by allowing the transmission of ambient sound past the earpieces and/or by providing a microphone to generate an input sound signal (for transmission to the earpieces) dependent upon the ambient sound.

A front-facing camera 122 may capture images to the front of the HMD, in use. A Bluetooth® antenna 124 may provide communication facilities or may simply be arranged as a directional antenna to allow a detection of the direction of a nearby Bluetooth transmitter.

In operation, a video signal is provided for display by the HMD. This could be provided by an external video signal source 80 such as a video games machine or data processing apparatus (such as a personal computer), in which case the signals could be transmitted to the HMD by a wired or a wireless connection 82. Examples of suitable wireless connections include Bluetooth® connections. Audio signals for the earpieces 60 can be carried by the same connection. Similarly, any control signals passed from the HMD to the video (audio) signal source may be carried by the same connection. Furthermore, a power supply 83 (including one or more batteries and/or being connectable to a mains power outlet) may be linked by a cable 84 to the HMD. Note that the power supply 83 and the video signal source 80 may be separate units or may be embodied as the same physical unit. There may be separate cables for power and video (and indeed for audio) signal supply, or these may be combined for carriage on a single cable (for example, using separate conductors, as in a USB cable, or in a similar way to a "power over Ethernet" arrangement in which data is carried as a balanced signal and power as direct current, over the same collection of physical wires). The video and/or audio signal may be carried by, for example, an optical fibre cable. In other embodiments, at least part of the functionality associated with generating image and/or audio signals for presentation to the user may be carried out by circuitry and/or processing forming part of the HMD itself. A power supply may be provided as part of the HMD itself.

Some embodiments of the invention are applicable to an HMD having at least one electrical and/or optical cable linking the HMD to another device, such as a power supply and/or a video (and/or audio) signal source. So, embodiments of the invention can include, for example:

(a) an HMD having its own power supply (as part of the HMD arrangement) but a cabled connection to a video and/or audio signal source;

(b) an HMD having a cabled connection to a power supply and to a video and/or audio signal source, embodied as a single physical cable or more than one physical cable;

(c) an HMD having its own video and/or audio signal source (as part of the HMD arrangement) and a cabled connection to a power supply; or (d) an HMD having a wireless connection to a video and/or audio signal source and a cabled connection to a power supply.

If one or more cables are used, the physical position at which the cable 82 and/or 84 enters or joins the HMD is not particularly important from a technical point of view. Aesthetically, and to avoid the cable(s) brushing the user's face in operation, it would normally be the case that the cable(s) would enter or join the HMD at the side or back of the HMD (relative to the orientation of the user's head when worn in normal operation). Accordingly, the position of the cables 82, 84 relative to the HMD in FIG. 1 should be treated merely as a schematic representation.

Accordingly, the arrangement of FIG. 1 provides an example of a head-mountable display system comprising a frame to be mounted onto an observer's head, the frame defining one or two eye display positions which, in use, are positioned in front of a respective eye of the observer and a display element mounted with respect to each of the eye display positions, the display element providing a virtual image of a video display of a video signal from a video signal source to that eye of the observer.

FIG. 1 shows just one example of an HMD. Other formats are possible: for example an HMD could use a frame more similar to that associated with conventional eyeglasses, namely a substantially horizontal leg extending back from the display portion to the top rear of the user's ear, possibly curling down behind the ear. In other (not full immersion) examples, the users view of the external environment may not in fact be entirely obscured; the displayed images could be arranged so as to be superposed (from the user's point of view) over the external environment. An example of such an arrangement will be described below with reference to FIG. 4.

In the example of FIG. 1, a separate respective display is provided for each of the user's eyes. A schematic plan view of how this is achieved is provided as FIG. 2, which illustrates the positions 100 of the users eyes and the relative position 110 of the users nose. The display portion 50, in schematic form, comprises an exterior shield 120 to mask ambient light from the users eyes and an internal shield 130 which prevents one eye from seeing the display intended for the other eye. The combination of the users face, the exterior shield 120 and the interior shield 130 form two compartments 140, one for each eye. In each of the compartments there is provided a display element 150 and one or more optical elements 160. The way in which the display element and the optical element(s) cooperate to provide a display to the user will be described with reference to FIG. 3.

Figure 3:
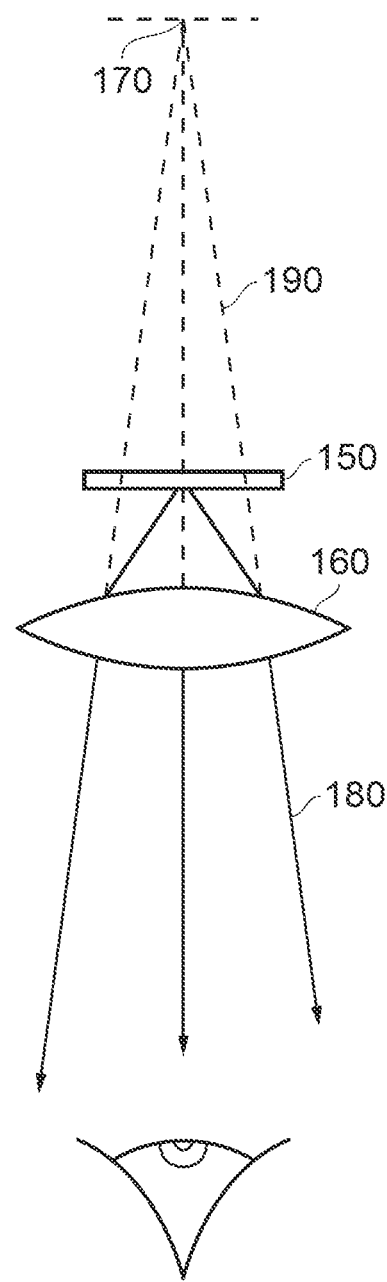
FIG. 3 schematically illustrates the formation of a virtual image by an HMD.

Referring to FIG. 3, the display element 150 generates a displayed image which is (in this example) refracted by the optical elements 160 (shown schematically as a convex lens but which could include compound lenses or other elements)

so as to generate a virtual image 170 which appears to the user to be larger than and significantly further away than the real image generated by the display element 150. As an example, the virtual image may have an apparent image size (image diagonal) of more than 1 m and may be disposed at a distance of more than 1 m from the user's eye (or from the frame of the HMD). In general terms, depending on the purpose of the HMD, it is desirable to have the virtual image disposed a significant distance from the user. For example, if the HMD is for viewing movies or the like, it is desirable that the user's eyes are relaxed during such viewing, which requires a distance (to the virtual image) of at least several meters. In FIG. 3, solid lines (such as the line 180) are used to denote real optical rays, whereas broken lines (such as the line 190) are used to denote virtual rays.

Figure 4:
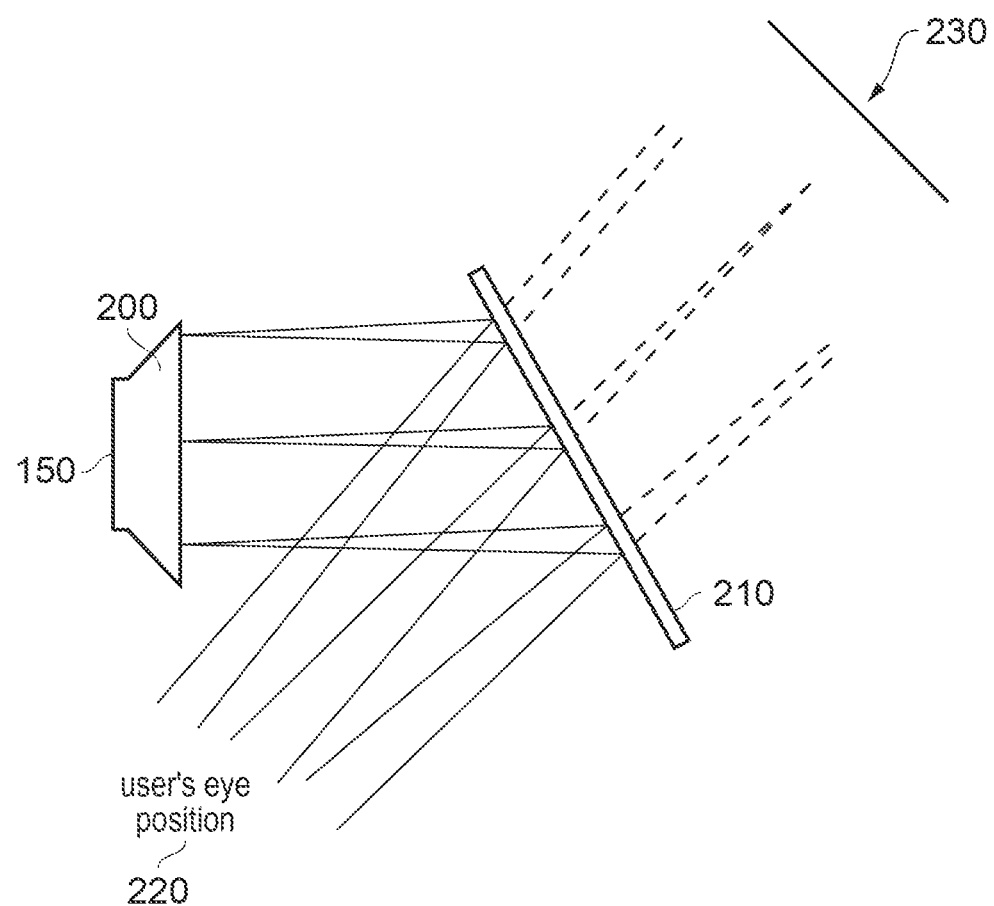
FIG. 4 schematically illustrates another type of display for use in an HMD.

An alternative arrangement is shown in FIG. 4. This arrangement may be used where it is desired that the users view of the external environment is not entirely obscured. However, it is also applicable to HMDs in which the users external view is wholly obscured. In the arrangement of FIG. 4, the display element 150 and optical elements 200 cooperate to provide an image which is projected onto a mirror 210, which deflects the image towards the user's eye position 220. The user perceives a virtual image to be located at a position 230 which is in front of the user and at a suitable distance from the user.

In the case of an HMD in which the users view of the external surroundings is entirely obscured, the mirror 210 can be a substantially 100% reflective mirror. The arrangement of FIG. 4 then has the advantage that the display element and optical elements can be located closer to the centre of gravity of the users head and to the side of the user's eyes, which can produce a less bulky HMD for the user to wear. Alternatively, if the HMD is designed not to completely obscure the user's view of the external environment, the mirror 210 can be made partially reflective so that the user sees the external environment, through the mirror 210, with the virtual image superposed over the real external environment.

Figure 5:
FIG. 5 schematically illustrates a pair of stereoscopic images.

In the case where separate respective displays are provided for each of the user's eyes, it is possible to display stereoscopic images. An example of a pair of stereoscopic images for display to the left and right eyes is shown in FIG. 5. The images exhibit a lateral displacement relative to one another, with the displacement of image features depending upon the (real or simulated) lateral separation of the cameras by which the images were captured, the angular convergence of the cameras and the (real or simulated) distance of each image feature from the camera position.

Note that the lateral displacements in FIG. 5 could in fact be the other way round, which is to say that the left eye image as drawn could in fact be the right eye image, and the right eye image as drawn could in fact be the left eye image. This is because some stereoscopic displays tend to shift objects to the right in the right eye image and to the left in the left eye image, so as to simulate the idea that the user is looking through a stereoscopic window onto the scene beyond. However, some HMDs use the arrangement shown in FIG. 5 because this gives the impression to the user that the user is viewing the scene through a pair of binoculars. The choice between these two arrangements is at the discretion of the system designer.

In some situations, an HMD may be used simply to view movies and the like. In this case, there is no change required to the apparent viewpoint of the displayed images as the user turns the user's head, for example from side to side. In other uses, however, such as those associated with virtual reality (VR) or augmented reality (AR) systems, the user's viewpoint needs to track movements with respect to a real or virtual space in which the user is located.

Figure 6:
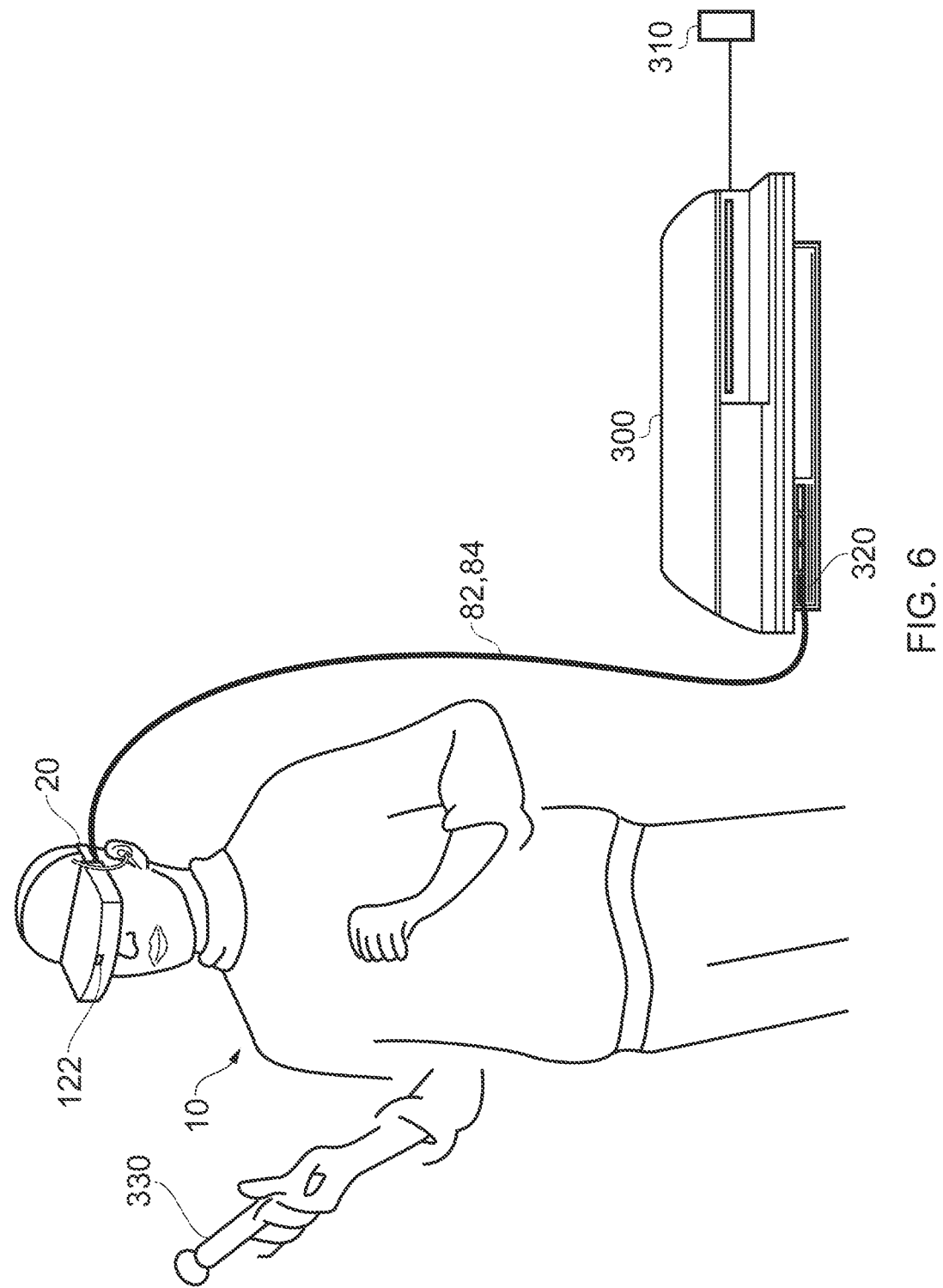
FIGS. 6 and 7 schematically illustrate a user wearing an HMD connected to a Sony® PlayStation 3® games console.

FIG. 6 schematically illustrates a user wearing an HMD connected to a Sony® PlayStation 3® games console 300 as an example of a base device. The games console 300 is connected to a mains power supply 310 and (optionally) to a main display screen (not shown). A cable, acting as the cables 82, 84 discussed above (and so acting as both power supply and signal cables), links the HMD 20 to the games console 300 and is, for example, plugged into a USB socket 320 on the console 300. Note that in the present embodiments, a single physical cable is provided which fulfils the functions of the cables 82, 84. In FIG. 6, the user is also shown holding a hand-held controller 330 which may be, for example, a Sony® Move® controller which communicates wirelessly with the games console 300 to control (or to contribute to the control of) game operations relating to a currently executed game program.

The video displays in the HMD 20 are arranged to display images generated by the games console 300, and the earpieces 60 in the HMD 20 are arranged to reproduce audio signals generated by the games console 300. Note that if a USB type cable is used, these signals will be in digital form when they reach the HMD 20, such that the HMD 20 comprises a digital to analogue converter (DAC) to convert at least the audio signals back into an analogue form for reproduction.

Images from the camera 122 mounted on the HMD 20 are passed back to the games console 300 via the cable 82, 84. Similarly, if motion or other sensors are provided at the HMD 20, signals from those sensors may be at least partially processed at the HMD 20 and/or may be at least partially processed at the games console 300. The use and processing of such signals will be described further below.

The USB connection from the games console 300 also provides power to the HMD 20, according to the USB standard.

Figure 7:
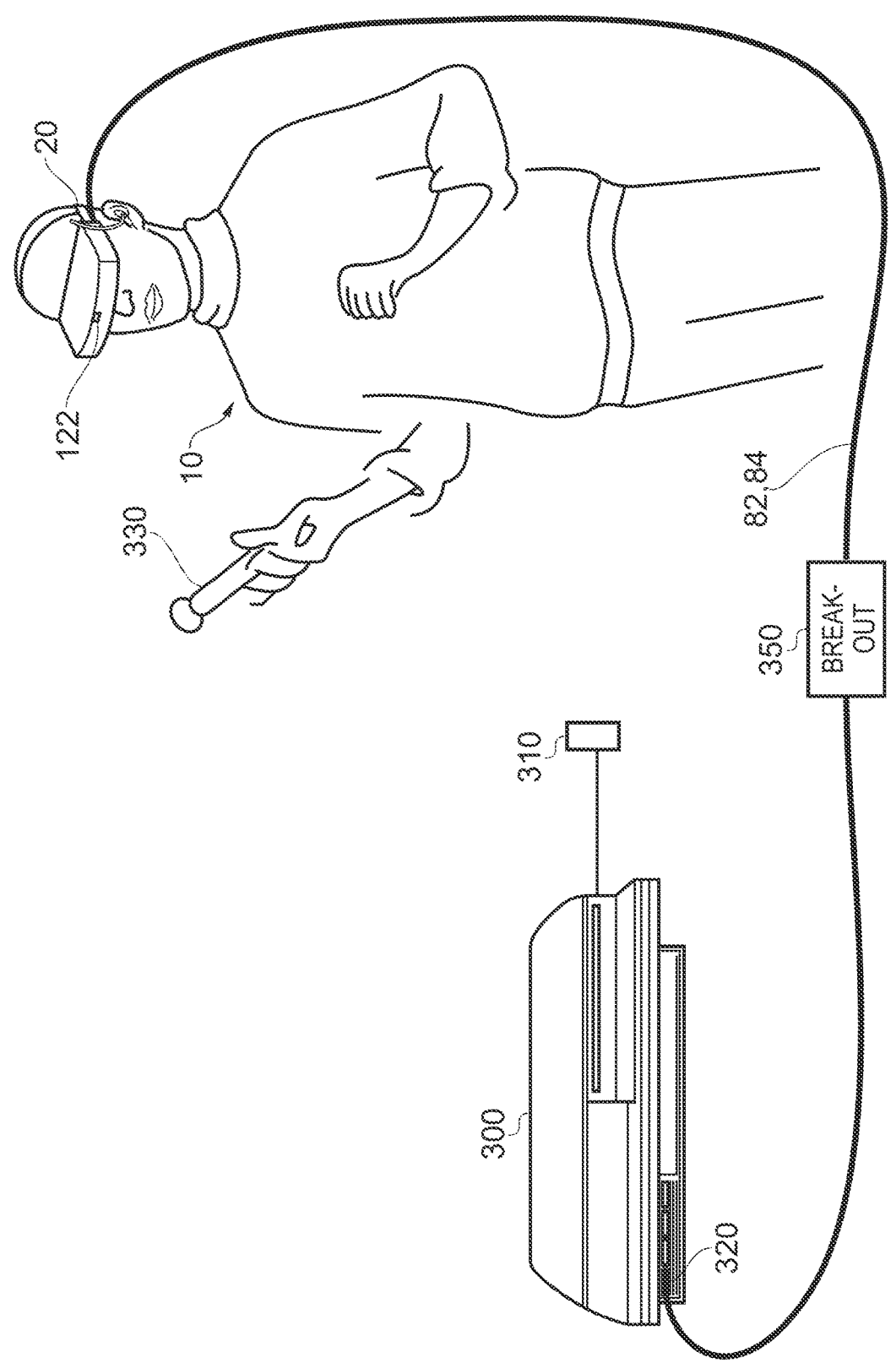

FIG. 7 schematically illustrates a similar arrangement in which the games console is connected (by a wired or wireless link) to a so-called "break out box" acting as a base or intermediate device 350, to which the HMD 20 is connected by a cabled link 82,84. The breakout box has various functions in this regard. One function is to provide a location, near to the user, for some user controls relating to the operation of the HMD, such as (for example) one or more of a power control, a brightness control, an input source selector, a volume control and the like. Another function is to provide a local power supply for the HMD (if one is needed according to the embodiment being discussed). Another function is to provide a local cable anchoring point. In this last function, it is not envisaged that the break-out box 350 is fixed to the ground or to a piece of furniture, but rather than having a very long trailing cable from the games console 300, the break-out box provides a locally weighted point so that the cable 82, 84 linking the HMD 20 to the break-out box will tend to move around the position of the break-out box. This can improve user safety and comfort by avoiding the use of very long trailing cables.

It will be appreciated that the localisation of processing in the various techniques described in this application can be varied without changing the overall effect, given that an HMD may form part of a set or cohort of interconnected devices (that is to say, interconnected for the purposes of data or signal transfer, but not necessarily connected by a physical cable). So, processing which is described as taking place "at" one device, such as at the HMD, could be devolved to another device such as the games console (base device) or the break-out box. Processing tasks can be shared amongst devices. Source signals, on which the processing is to take place, could be distributed to another device, or the processing results from the processing of those source signals could be sent to another device, as required. So any references to processing taking place at a particular device should be understood in this context. Similarly, where an interaction between two devices is basically symmetrical, for example where a camera or sensor on one device detects a signal or feature of the other device, it will be understood that unless the context prohibits this, the two devices could be interchanged without any loss of functionality.

As mentioned above, in some uses of the HMD, such as those associated with virtual reality (VR) or augmented reality (AR) systems, the user's viewpoint needs to track movements with respect to a real or virtual space in which the user is located.

This tracking is carried out by detecting motion of the HMD and varying the apparent viewpoint of the displayed images so that the apparent viewpoint tracks the motion.

Figure 8:
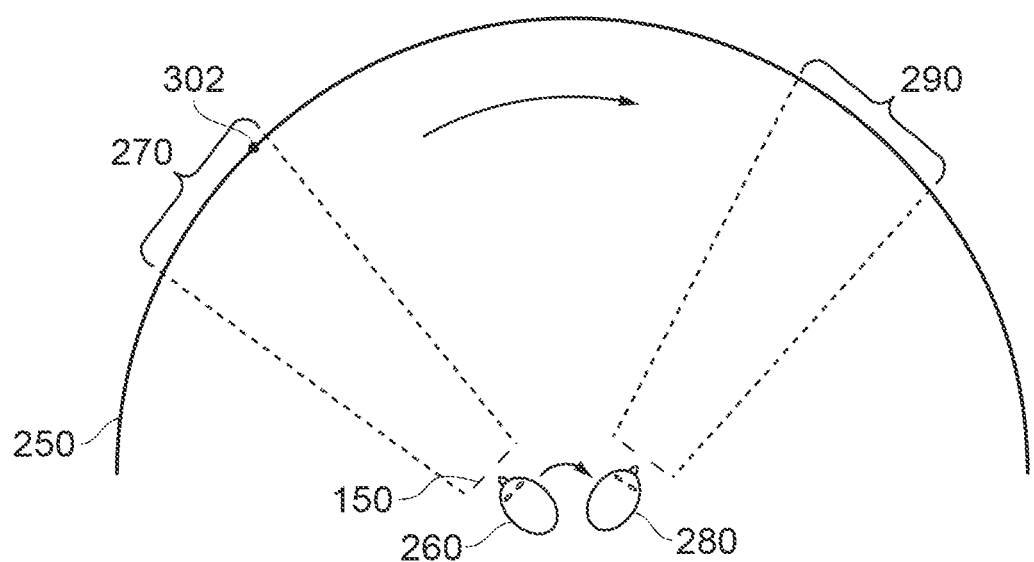
FIG. 8 schematically illustrates a change of view of user of an HMD.

FIG. 8 schematically illustrates the effect of a user head movement in a VR or AR system.

Referring to FIG. 8, a virtual environment is represented by a (virtual) spherical shell 250 around a user. Because of the need to represent this arrangement on a two-dimensional paper drawing, the shell is represented by a part of a circle, at a distance from the user equivalent to the separation of the displayed virtual image from the user. A user is initially at a first position 260 and is directed towards a portion 270 of the virtual environment. It is this portion 270 which is represented in the images displayed on the display elements 150 of the user's HMD.

Consider the situation in which the user then moves his head to a new position and/or orientation 280. In order to maintain the correct sense of the virtual reality or augmented reality display, the displayed portion of the virtual environment also moves so that, at the end of the movement, a new portion 290 is displayed by the HMD.

So, in this arrangement, the apparent viewpoint within the virtual environment moves with the head movement. If the head rotates to the right side, for example, as shown in FIG. 8, the apparent viewpoint also moves to the right from the user's point of view. If the situation is considered from the aspect of a displayed object, such as a displayed object 300, this will effectively move in the opposite direction to the head movement. So, if the head movement is to the right, the apparent viewpoint moves to the right but an object such as the displayed object 300 which is stationary in the virtual environment will move towards the left of the displayed image and eventually will disappear off the left-hand side of the displayed image, for the simple reason that the displayed portion of the virtual environment has moved to the right whereas the displayed object 300 has not moved in the virtual environment.

Figure 2:
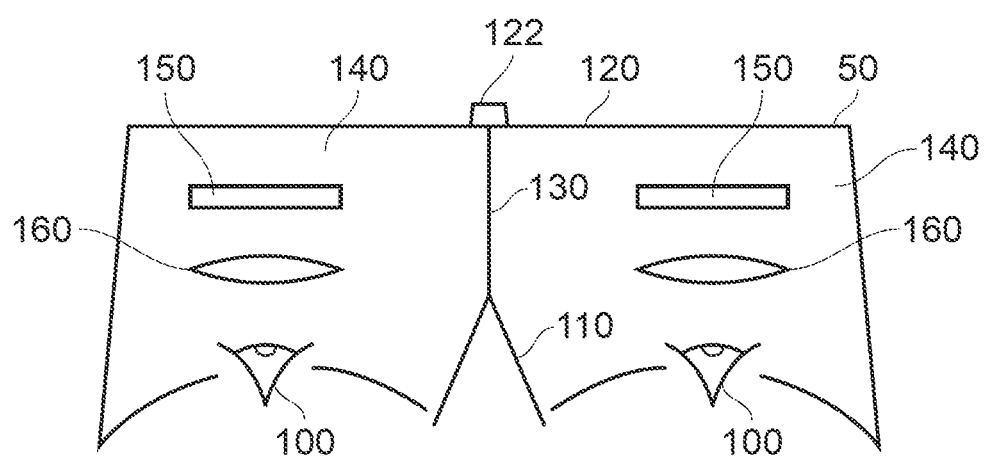
FIG. 2 is a schematic plan view of an HMD.
Figure 9A:
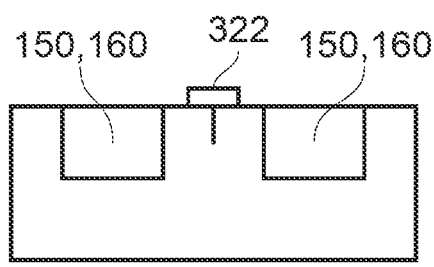
FIGS. 9a and 9b schematically illustrate HMDs with motion sensing.
Figure 9B:
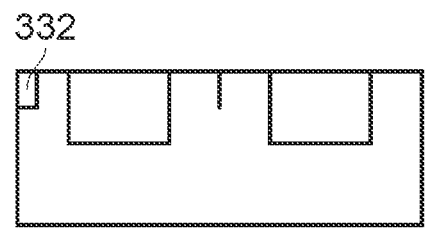

FIGS. 9a and 9b schematically illustrated HMDs with motion sensing. The two drawings are in a similar format to that shown in FIG. 2. That is to say, the drawings are schematic plan views of an HMD, in which the display element 150 and optical elements 160 are represented by a simple box shape. Many features of FIG. 2 are not shown, for clarity of the diagrams. Both drawings show examples of HMDs with a motion detector for detecting motion of the observer's head.

In FIG. 9a, a forward-facing camera 322 is provided on the front of the HMD. This may be the same camera as the camera 122 discussed above, or may be an additional camera. This does not necessarily provide images for display to the user (although it could do so in an augmented reality arrangement). Instead, its primary purpose in the present embodiments is to allow motion sensing. A technique for using images captured by the camera 322 for motion sensing will be described below in connection with FIG. 10. In these arrangements, the motion detector comprises a camera mounted so as to move with the frame; and an image comparator operable to compare successive images captured by the camera so as to detect inter-image motion.

FIG. 9b makes use of a hardware motion detector 332. This can be mounted anywhere within or on the HMD. Examples of suitable hardware motion detectors are piezoelectric accelerometers or optical fibre gyroscopes. It will of course be appreciated that both hardware motion detection and camera-based motion detection can be used in the same device, in which case one sensing arrangement could be used as a backup when the other one is unavailable, or one sensing arrangement (such as the camera) could provide data for changing the apparent viewpoint of the displayed images, whereas the other (such as an accelerometer) could provide data for image stabilisation.

Figure 10:
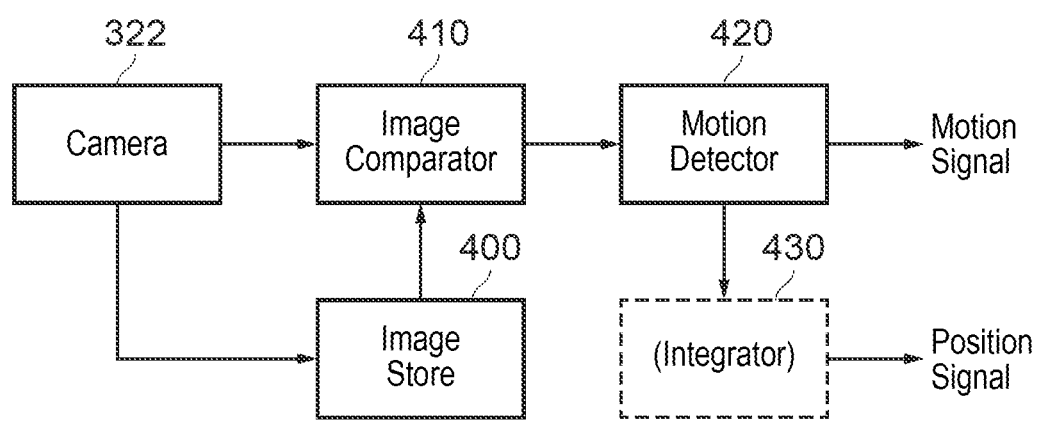
FIG. 10 schematically illustrates a position sensor based on optical flow detection.

FIG. 10 schematically illustrates one example of motion detection using the camera 322 of FIG. 9a.

The camera 322 is a video camera, capturing images at an image capture rate of, for example, 25 images per second. As each image is captured, it is passed to an image store 400 for storage and is also compared, by an image comparator 410, with a preceding image retrieved from the image store. The comparison uses known block matching techniques (so-called "optical flow" detection) to establish whether substantially the whole image has moved since the time at which the preceding image was captured. Localised motion might indicate moving objects within the field of view of the camera 322, but global motion of substantially the whole image would tend to indicate motion of the camera rather than of individual features in the captured scene, and in the present case because the camera is mounted on the HMD, motion of the camera corresponds to motion of the HMD and in turn to motion of the user's head.

The displacement between one image and the next, as detected by the image comparator 410, is converted to a signal indicative of motion by a motion detector 420. If required, the motion signal is converted by to a position signal by an integrator 430.

As mentioned above, as an alternative to, or in addition to, the detection of motion by detecting inter-image motion between images captured by a video camera associated with the HMD, the HMD can detect head motion using a mechanical or solid state detector 332 such as an accelerometer. This can in fact give a faster response in respect of the indication of motion, given that the response time of the video-based system is at best the reciprocal of the image capture rate. In some instances, therefore, the detector 332 can be better suited for use with higher frequency motion detection. However, in other instances, for example if a high image rate camera is used (such as a 200 Hz capture rate camera), a camera-based system may be more appropriate. In terms of FIG. 10, the detector 332 could take the place of the camera 322, the image store 400 and the comparator 410, so as to provide an input directly to the motion detector 420. Or the detector 332 could take the place of the motion detector 420 as well, directly providing an output signal indicative of physical motion.

Other position or motion detecting techniques are of course possible. For example, a mechanical arrangement by which the HMD is linked by a moveable pantograph arm to a fixed point (for example, on a data processing device or on a piece of furniture) may be used, with position and orientation sensors detecting changes in the deflection of the pantograph arm. In other embodiments, a system of one or more transmitters and receivers, mounted on the HMD and on a fixed point, can be used to allow detection of the position and orientation of the HMD by triangulation techniques. For example, the HMD could carry one or more directional transmitters, and an array of receivers associated with known or fixed points could detect the relative signals from the one or more transmitters. Or the transmitters could be fixed and the receivers could be on the HMD. Examples of transmitters and receivers include infra-red transducers, ultrasonic transducers and radio frequency transducers. The radio frequency transducers could have a dual purpose, in that they could also form part of a radio frequency data link to and/or from the HMD, such as a Bluetooth® link.

Figure 11:
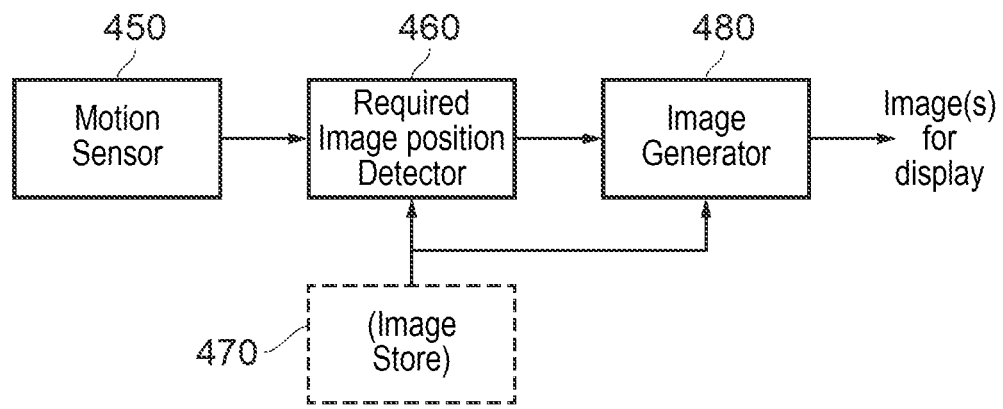
FIG. 11 schematically illustrates the generation of images in response to HMD position or motion detection.

FIG. 11 schematically illustrates image processing carried out in response to a detected position or change in position of the HMD.

As mentioned above in connection with FIG. 10, in some applications such as virtual reality and augmented reality arrangements, the apparent viewpoint of the video being displayed to the user of the HMD is changed in response to a change in actual position or orientation of the user's head.

With reference to FIG. 11, this is achieved by a motion sensor 450 (such as the arrangement of FIG. 10 and/or the motion detector 332 of FIG. 9b) supplying data indicative of motion and/or current position to a required image position detector 460, which translates the actual position of the HMD into data defining the required image for display. An image generator 480 accesses image data stored in an image store 470 if required, and generates the required images from the appropriate viewpoint for display by the HMD. The external video signal source can provide the functionality of the image generator 480 and act as a controller to compensate for the lower frequency component of motion of the observer's head by changing the viewpoint of the displayed image so as to move the displayed image in the opposite direction to that of the detected motion so as to change the apparent viewpoint of the observer in the direction of the detected motion.

A concern which can arise in connection with the use of an HMD, particularly one which represents a full immersion environment, is that of possible nausea if the HMD is used while the user is moving. For example, if an HMD wearer is travelling in a vehicle (such as a car, bus, train, ship, aeroplane or the like) then the HMD wearer may feel the effects of the motion through his body and in particular his vestibular system, but is denied any visual cues which correlate to the motion. Indeed, the HMD display may be providing visual cues relating to different motion, depending upon the images being displayed to the user via the HMD. This imbalance between sensory cues as to motion of the user can potentially lead to nausea for the user.

Figure 12A:
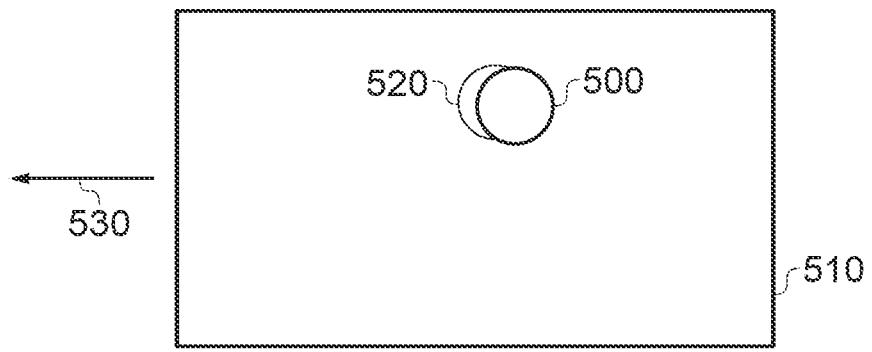
FIGS. 12a to 12c schematically illustrate an HMD user in a moving vehicle.
Figure 12B:
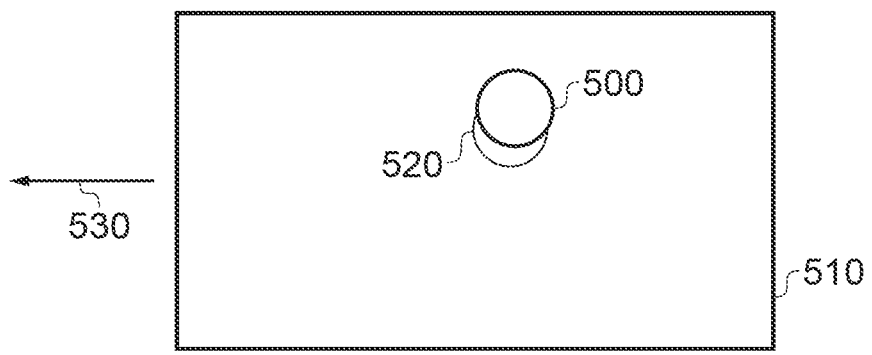
Figure 12C:
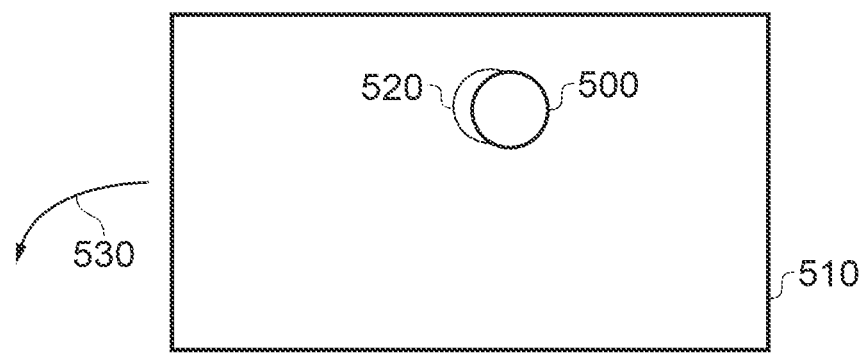

In order to explain some examples of this problem, FIGS. 12a to 12c schematically illustrate an HMD user 500 in a moving vehicle 510. The circle 500 represents a plan view of the user's head, and an additional portion 520 represents a plan view of an HMD, so as to indicate the direction in which the user's head is currently oriented (which is to say, the HMD wearer is wearing the HMD at the front of his or her head). The direction of motion of the vehicle 510 is indicated by an arrow 530.

In FIG. 12a, the user is facing forwards with respect to the moving vehicle 510, but it may be that the display currently provided by the HMD does not take into account the overall (physical) motion of the user in the forwards direction.

In FIG. 12b, the user is facing to the side with respect to the moving vehicle 510. The visual cues provided by the HMD display may indicate motion which is in a lateral direction compared to that of the moving vehicle 510.

In FIG. 12c, the user is again facing forward with respect to the vehicle 510, but the vehicle itself is turning according to a path indicated by the arrow 530.

Any of these arrangements can give rise to feelings of nausea or unpleasantness on the part of the user. Techniques to address this problem will be discussed below.

Figure 13A:
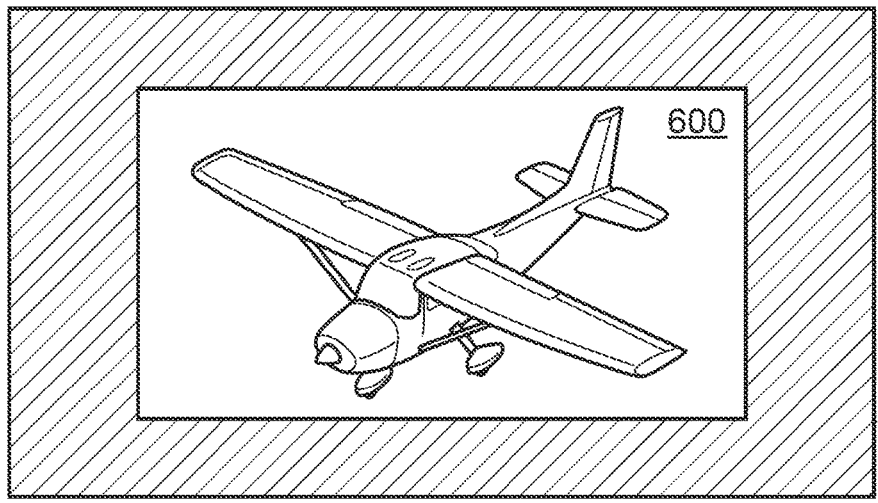
FIGS. 13a to 13c schematically illustrate HMD displays.
Figure 13B:
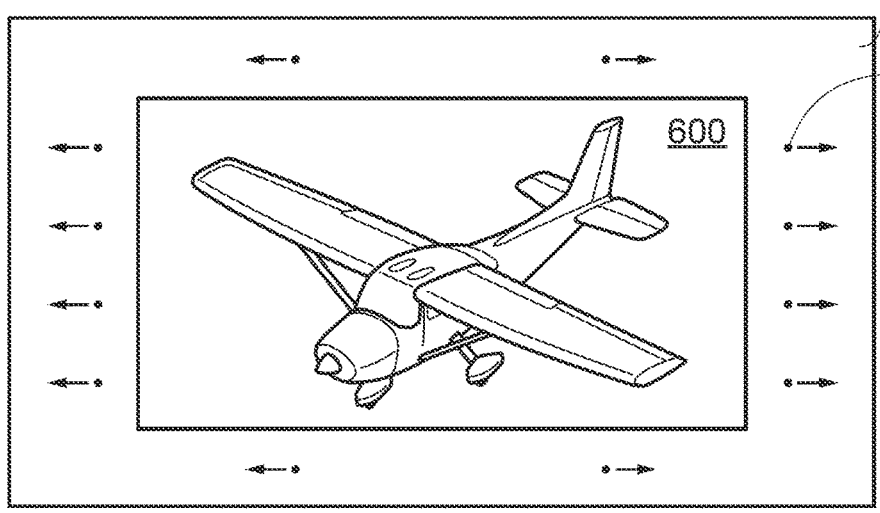
Figure 13C:
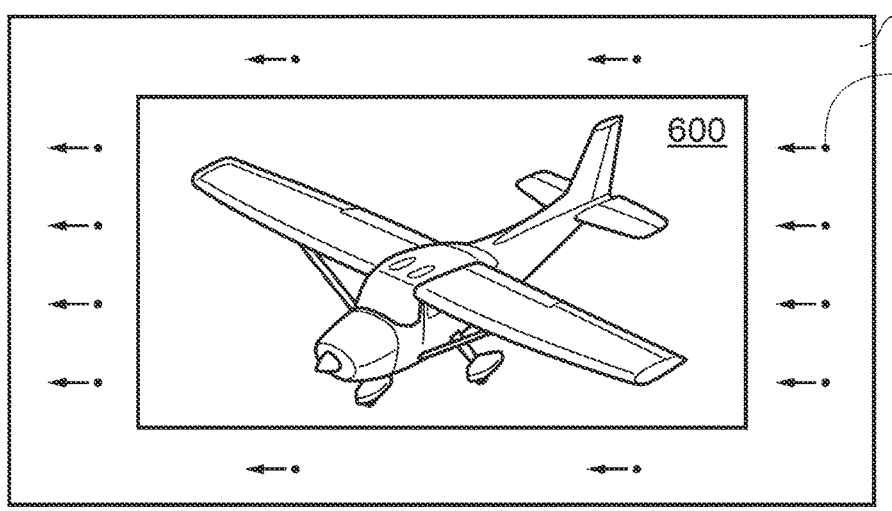

FIGS. 13a to 13c schematically illustrate HMD displays.

Referring to FIG. 13a, a basic HMD display provides an image portion 600 surrounded by a dark border 610. This type of HMD display provides no assistance specifically in respect of the problem discussed above.

In FIG. 13b, a border region 620 around the image portion 600 is provided with multiple objects 630 which move in a direction so as to simulate the real environment going past a moving user. So, if the user in the examples of FIGS. 12a-12c is moving forwards, the objects 630 are displayed so as to move outwards with respect to the image portion 600 in order to simulate features of the real environment going past the user as the user moves forward. The objects 630 can be abstract shapes or even simple points, similar in some respects to a so-called "star field" display sometimes used as a screensaver, so as not to distract the user from the content being displayed in the image portion 600. They can be light objects on a dark background so that the degree of contrast provided in the image portion 600 is relatively unaffected by the presence of the objects. They can be randomly generated with respect to the time at which they appear near the peripheral edge of the image portion 600 and also with respect to the position within the border 630 at which they first appear. As objects move off the display area, further objects can be initiated.

The display objects can be provided at the extreme periphery of a user's vision. Indeed, because of the way in which the optical axis of the eye moves as the eye rotates, the arrangement may be such that the objects are visible when the user is not looking at them, as peripheral objects, but when the user's eye turns to look at them they might be outside the user's available viewing range with respect to the display system in use. However, in other embodiments, the objects are visible whether or not the viewer is looking directly at them.

The image portion 600 represents an example of a virtual video screen to the user and the border region 620 represents an example of at least part of the periphery of the virtual video screen.

The example of FIG. 13b relates in particular to the motion represented by FIG. 12a, in which the user is facing in the same direction as the users overall motion. In FIG. 13c, motion of the type represented by FIG. 12b, in which the user is not facing in the same direction as the users overall motion, is considered. Here, objects 630' are again displayed so as to move in the direction that real objects would appear to move if the user were not wearing the HMD, but in this instance this means that the direction is not outwards with respect to the image portion 600 at from side to side such that the objects either side of the image portion 600 or move from the right to the left (in this example).

In general, the overall motion of the user, relative to the orientation of the HMD, is used to establish objects or other image features in a border region surrounding an active image region 600 which move in the same general direction as real objects would be seen to move were the user not wearing the HMD.

Many different types of object or image feature can be used in place of the ones shown in FIGS. 13b and 13c. For example, rather than discrete objects, a noise pattern, a texture pattern or a pattern of stripes could be used and could be made to move in the required direction.

Figure 14:
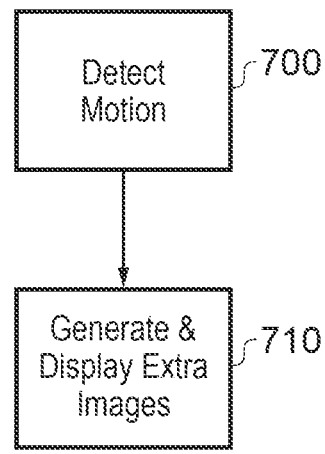
FIG. 14 is a flowchart schematically illustrating part of the operation of an HMD.

FIG. 14 is a flowchart schematically illustrating part of the operation of an HMD. At a step 700, the HMD's overall (physical) motion relative to its current orientation is detected, and at a step 710 extra image material is displayed so as to move in the same general direction as real objects would be seen to move if the user were not wearing the HMD.

Figure 15:
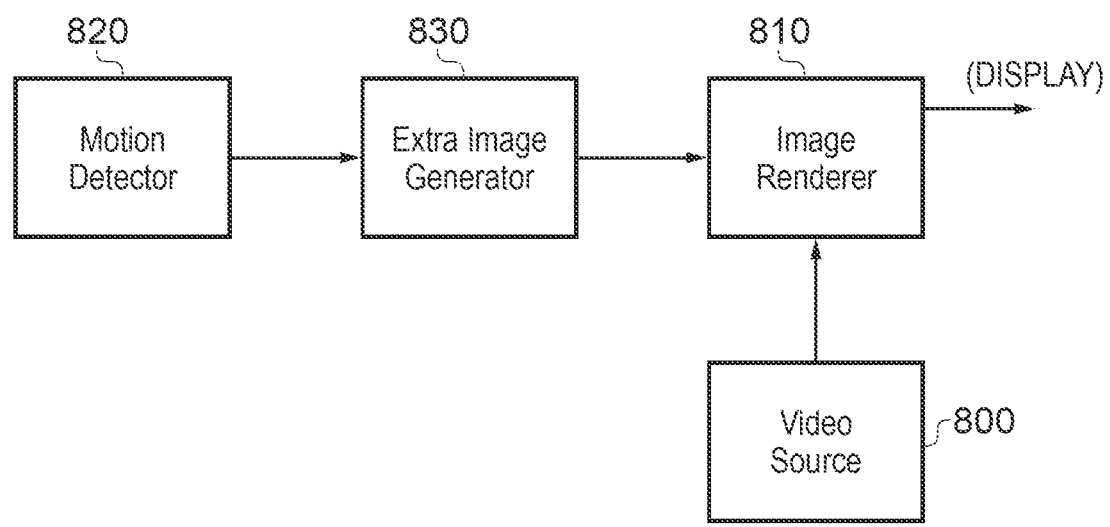
FIG. 15 schematically illustrates a part of an HMD.

FIG. 15 schematically illustrates a part of an HMD.

A video source 800 provides video material to an image renderer 810 which generates video to be displayed to the user.

A motion detector 820 detects the overall motion of the user (or, rather, the overall motion of the HMD) relative to the current orientation of the HMD. In the case of steady linear motion, which is motion that is relevant to the present techniques but not necessarily relevant to game play or other operations of an HMD, an accelerometer would not detect this type of motion, but it can be detected by, for example, optical flow image analysis of images captured by a forward facing camera (such as the camera 122/322 described above) using the techniques described earlier, and/or by a position detector such as a GPS sensor associated with the HMD (or indeed with the vehicle, with location data being transmitted to the HMD via, for example, a Bluetooth link).

An extra image generator 830 generates extra image material such as moving objects or moving patterns as discussed above for display around the periphery of an active image area such as the area 600. The extra image material is passed to the image renderer 810 for rendering as part of the final image for display to the user.

In other embodiments, the extra image material could be provided to the HMD in the form of metadata associated with image or video material received by the HMD, for display by the HMD in case the HMD is detected to be in motion.

In the case of travel in an aeroplane, if the aeroplane makes a correctly banked turn, the apparent gravity as experienced by a user and the HMD that the user is wearing will still be directed straight down through the user's seat, so no further correction is needed.

In other respects, compensation for vertical movement should (in some embodiments) be retained, so as to make viewing more comfortable on bumpy roads and the like.

The extra image material could (in some embodiments) represent the actual surroundings that the user is passing through. For example, the HMD could download Google® Streetview™ data providing images relating to the actual environment, and display portions of that data to simulate physical movement through that environment. The physical position or location of the user could be obtained by association with a GPS receiver, for example as discussed above. As an alternative (or in addition) a moving map of the physical environment could be displayed in a lower portion of the HMD display so as to simulate the passage of the user over that environment. Such techniques could be particularly relevant to self-driving cars or other vehicles.

Accordingly, embodiments of the invention can provide a head mountable display (HMD) operable to detect the HMD's overall motion relative to its current orientation, and to display extra image material so that the extra image material moves in the same general direction as real objects would be seen by the user to move if the user were not wearing the HMD. In some embodiments, the extra image material can comprise discrete objects, for example light objects on a dark background. In other embodiments, the extra image material can comprise an image pattern. In embodiments, the HMD is operable to display a virtual video screen to the user and to display the extra image material about at least part of the periphery of the virtual video screen.

In some embodiments, the detection of the HMD's overall motion relative to its current orientation can be by image analysis of images captured by a camera mounted with respect to the HMD.

In other embodiments, the detection of the HMD's overall motion relative to its current orientation can be, at least in part, by a position detector such as a GPS detector, which may be associated with the HMD may form part of or be associated with a moving vehicle in which the HMD is situated. In such embodiments the extra image material may comprise map data or image data relating to the physical location of the HMD.

In some embodiments the HMD is operable to display received image material having associated metadata defining the extra image material. In other words, the extra image material (for example, extra image material appropriate to current video material) is provided with or in association with the current video material.

Embodiments of the invention also provide a system comprising an HMD and one or more of a base device such as a games console and an intermediate device such as a break-out box.

Embodiments of the invention can provide a method of operation of a head mountable display (HMD) comprising: detecting the HMD's overall motion relative to its current orientation, and displaying extra image material so that the extra image material moves in the same general direction as real objects would be seen by the user to move if the user were not wearing the HMD.

It will be appreciated that the various techniques described above may be carried out using software, hardware, software programmable hardware or combinations of these. It will be appreciated that such software, and a providing medium by which such software is provided (such as a machine-readable non-transitory storage medium, for example a magnetic or optical disc or a non-volatile memory) are considered as embodiments of the present invention.

Obviously, numerous modifications and variations of the present disclosure are possible in light of the above teachings. It is therefore to be understood that within the scope of the appended claims, the invention may be practiced otherwise than as specifically described herein.

We claim:

1. A head mountable display (HMD) comprising:
    a motion detector configured to detect an overall motion of the HMD relative to a current orientation of the HMD, and
    a display generator configured to generate for display:
        extra image material so that the extra image material moves in a same general direction as real objects would be seen by a user to move if the user were not wearing the HMD, wherein the extra image material is in the form of display objects;
    in which the HMD is configured to display a virtual video screen to the user, and the display generator is configured to generate the extra image material about at least part of a periphery of the virtual video screen, such that rotation of an optical axis of the user's eye as the eye rotates, in use, provides that the extra image material is visible in peripheral vision of the user when not looking at the extra image material, but when the user turns their eye to look at the extra image material, the extra image material is outside of the user's available viewing range with respect to the HMD in use.

2. An HMD according to claim 1, in which the extra image material comprises discrete objects.

3. An HMD according to claim 2, in which the discrete objects are light objects on a dark background.

4. An HMD according to claim 1, in which the extra image material comprises an image pattern.

5. An HMD according to claim 1, comprising a camera mounted with respect to the HMD, the HMD being configured to detect the overall motion of the HMD relative to the current orientation of the HMD by image analysis of images captured by the camera.

6. An HMD according to claim 1, comprising a global positioning system (GPS) detector.

7. An HMD according to claim 1, wherein the HMD is configured to acquire position data from a position detector associated with the moving vehicle in which the HMD is situated.

8. An HMD according to claim 6, in which the extra image material comprises map data or image data relating to a physical location of the HMD.

9. An HMD according to claim 1, in which the HMD is configured to display received image material having associated metadata defining the extra image material.

10. A system, comprising:
   a head mountable display (HMD) comprising:
      a motion detector configured to detect an overall motion of the HMD relative to a current orientation of the HMD, and
      a display generator configured to generate for display:
         extra image material so that the extra image material moves in a same general direction as real objects would be seen by a user to move if the user were not wearing the HMD, wherein the extra image material is in the form of display objects;
   in which the HMD is configured to display a virtual video screen to the user, and the display generator is configured to generate the extra image material about at least part of a periphery of the virtual video screen, such that rotation of an optical axis of the user's eye as the eye rotates, in use, provides that the extra image material is visible in peripheral vision of the user when not looking at the extra image material, but when the user turns their eye to look at the extra image material, the extra image material is outside of the user's available viewing range with respect to the HMD in use; and
   one or more of a base device and an intermediate device coupled to the HMD.

11. A method of operation of a head mountable display (HMD), the method comprising:
   displaying a virtual video screen to an HMD user;
   detecting overall motion of the HMD relative to the current orientation of the HMD; and
   displaying extra image material, in the form of display objects, about at least part of a periphery of a virtual video screen, such that rotation of an optical axis of the HMD user's eye as the eye rotates, in use, provides that the extra image material is visible in peripheral vision of the HMD user when not looking at the extra image material, but when the HMD user turns their eye to look at the extra image material, the extra image material is outside of the HMD user's available viewing range with respect to the HMD in use, so that the extra image material moves in a same general direction as real objects would be seen by the HMD user to move if the HMD user were not wearing the HMD.

12. A non-transitory machine-readable storage medium which stores computer software which, when executed by a computer, causes the computer to carry out the method of claim 11.

* * * * *